United States Patent [19]

Hammond et al.

[11] 3,838,861

[45] Oct. 1, 1974

[54] DISC SEARCH UNIT

[75] Inventors: Robert J. Hammond, Stevensville; John F. Arent, Benton Harbor; Carl W. Miller, Dowagiac; Michael H. Estkowski, St. Joseph, all of Mich.

[73] Assignee: V-M Corporation, Benton Harbor, Mich.

[22] Filed: Apr. 24, 1972

[21] Appl. No.: 247,013

[52] U.S. Cl. .............. 274/23 R, 274/9 R, 274/13 R

[51] Int. Cl. .............................................. G11b 3/10

[58] Field of Search.......... 274/7, 9 R, 13 R, 14, 15, 274/23 R

[56] References Cited

UNITED STATES PATENTS

| | | | |
|---|---|---|---|
| 2,488,260 | 11/1949 | Ascoli | 274/23 R |
| 2,532,555 | 12/1950 | Kamler | 274/15 R |
| 2,582,592 | 1/1952 | Kamler | 274/9 R |
| 2,939,714 | 6/1960 | Dennis | 274/9 R X |
| 2,983,514 | 5/1961 | Thevenaz | 274/9 R X |
| 3,503,615 | 3/1970 | Matsuda | 274/9 RA |

*Primary Examiner*—Louis R. Prince
*Assistant Examiner*—Charles E. Phillips
*Attorney, Agent, or Firm*—Johnson, Dienner, Emrich, Verbeck & Wagner

[57] ABSTRACT

The disclosure is directed to the mechanism for locating on, and reading out from, a flat disc record, by means of a pick-up needle, selected information which is recorded thereon. The overall controls for selecting and retrieving or reading out the desired parts of the recorded information, and for utilizing the information, are not a part of the present invention. The mechanism here disclosed and claimed is adapted to the performance, in sequence, of certain required mechanical operations and means for performing the same, some of which have utility in other fields such, for example, as record playing phonographs and the like.

16 Claims, 10 Drawing Figures

DISC SEARCH UNIT

The invention herein disclosed and claimed is embodied in the mechanism for rotating the disc record on which the selected items of information are recorded, raising the tone arm, and moving it from its home position adjacent the center of the turntable outwardly to the radial position corresponding to the location in the grooves of the record of information which is to be read out. The mechanism is adapted then to lower the pick-up needle into the groove for the purpose of reading out the desired item recorded in the grooves selected. Then the tone arm is moved out of the groove and swung backwardly to its home position. Control of the movements of the tone arm is exercised by the group of cams and the magnetic clutch which swing the tone arm and pick-up to the selected radial position on the record to permit reading out of the information selected. Then the cams raise the needle out of the groove and return the tone arm to the home position. These mechanical movements are controlled by cams which are utilized for raising the tone arm and its needle and for restoring the same to the home position and such incidental control movements of the involved parts as are necessary.

BACKGROUND OF THE INVENTION

The present improvements have been made in the course of development of a system of recording in compact form on a flat disc record a large volume of separate items of information such as individual credit data from which specific items may be called for. This involves the adaptation of phonograph reproduction structure and operation for the mechanical phases of retrieving the information recorded, in each instance, at a precise location on a record having a spiral groove, or its equivalent, and duly indexed. In the course of this development improvements of inventive character have arisen which improvements are not restricted, in use, to the selection and reading out of detached entries of information but are applicable to the general field of reproduction of recorded information or broadly intelligible information signals including sound.

FIELD OF THE INVENTION HERE INVOLVED

The basic idea underlying the present invention is the cooperation of a pick-up needle with a groove similar to that employed in phonographic recording and reproduction. The foreground of the invention is means for performing expeditiously, efficiently, in sequence, and with minimum physical equipment the mechanical operations involved in locating the particular entry to be read out, reading out the same, and restoring the equipment to zero or home position for the next selection and performance. The operation of directing the needle to the location of recorded information which is sought is termed "searching."

The most nearly related art is the art of phonograph record players.

SUMMARY OF THE INVENTION

The claimed subject matter is the mechanism which is part of a system of information recording and retrieval of separate items of information separately recorded and separately indexed. The individual items to be read out are selectable by reference to an index which is available to the operator who initiates the operation of the system. The system of retrieving information is herein referred to for the purpose of clarifying the structure and mode of operation of the search means herein disclosed which perform the mechanical operations involved in the operation of the system of information retrieval. The mechanical structures and their modes or operation of the present invention are assimilated to the art of phonographic record players.

The basic elements of a rotatable disc record and of a cooperating pick-up needle are supplemented by ancillary equipment and controls for performing rapidly and accurately the operations of locating the precise position of the selected information and the swift and accurate application of the readout means to the specific record involved. In the structure herein disclosed this involves accurate selection of the groove and playing out of the record in the groove and prompt return of the tone arm and needle to the "home" position which is at the central region of the record disc.

OBJECTS OF THE INVENTION

The chief object of the invention is the provision of improved and simplified mechanism, involving a disc record and a cooperating tone arm carrying a readout needle, organized to move the needle with respect to the grooves for identification of the location of the desired information and for moving the record in respect of the needle for playing out or reading out the desired item of information from the selected part of the groove.

A further object of the invention is the provision of automatic restoring mechanism for automatically restoring the tone arm to zero or home position upon completion of the readout or performance of a specific information search and retrieval operation.

A further object is to provide a spring return of the tone arm to home position under the control of an adjustable friction brake.

A further object is to provide means for moving the pick-up needle from home position adjacent the axis of the turntable and radially outward from home position while in contact with the grooved surface of the disc during its rotation.

A further object is to provide means for instant release of the connection between the driving cam and the tone arm to limit overtravel of the needle with respect to the desired groove.

It is a further object of the invention to provide a motor driven cam shaft having a cam to actuate the tone arm control lever through an electromagnet coupling of said lever to a tone arm control lever whereby the coupling may be released independently of the cam.

It is a further object to provide a tone arm mounted as a second class lever on a vertical shaft movable axially to raise or lower the tone arm and angularly to position the tone arm needle on the record.

It is a further object of the invention to stop the cam operating motor for a time long enough to permit a readout of the selected groove of a search operation.

It is a further object to provide a cam shaft having a cam which exerts control of the sweep of the tone arm over the disc record and a cam having a control of the lift of the tone arm from the record.

It is a further object to provide a cam shaft having a cam follower releasably connected to a tone arm, said connection operating through a releasable electromagnetic coupling, and a spring for causing the follower to restore the tone arm to home position when said coupling is released.

It is a further object to provide a cam shaft which has a cam follower controlling the radial positioning of the tone arm and its pick-up on the disc record, said control operating through a releasable electromagnetic coupling, and a spring for causing the follower to restore the tone arm in the raised position to home position.

It is a further object to provide a tone arm mechanism wherein a horizontally disposed pivot intermediate the ends of the tone arm connects the tone arm and a vertical tone arm shaft journalled on a vertical axis and being axially movable, and an arcuate braking surface concentric with said vertical shaft and adapted to be engaged by the rear end of the tone arm when the vertical shaft is raised to lift the tone arm away from the surface of the record.

DESCRIPTION OF THE PREFERRED EMBODIMENT

Figure 1:
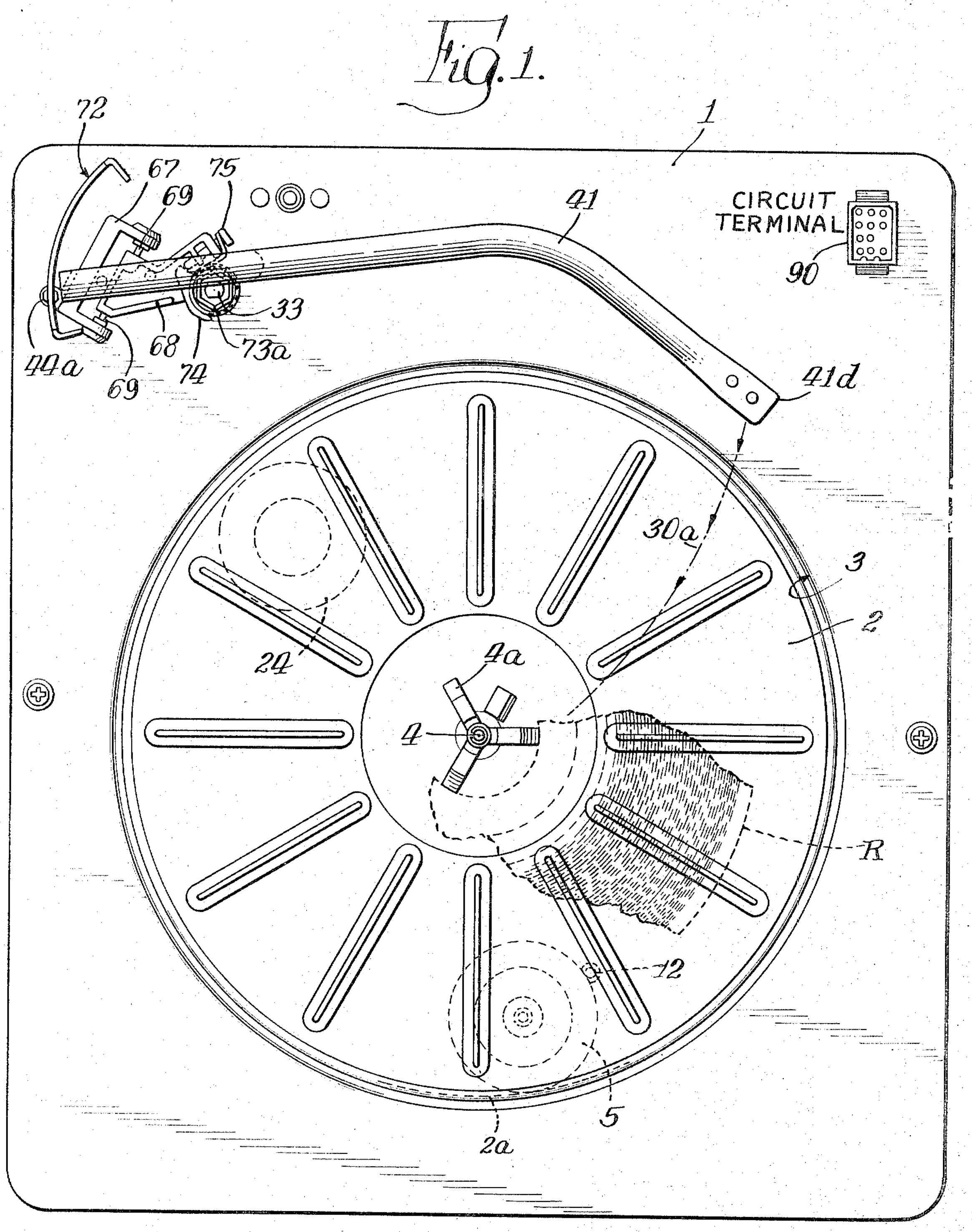
FIG. 1 is a top plan view of the frame, turntable, and tone arm mechanism of an embodiment of the invention.
Figure 4:
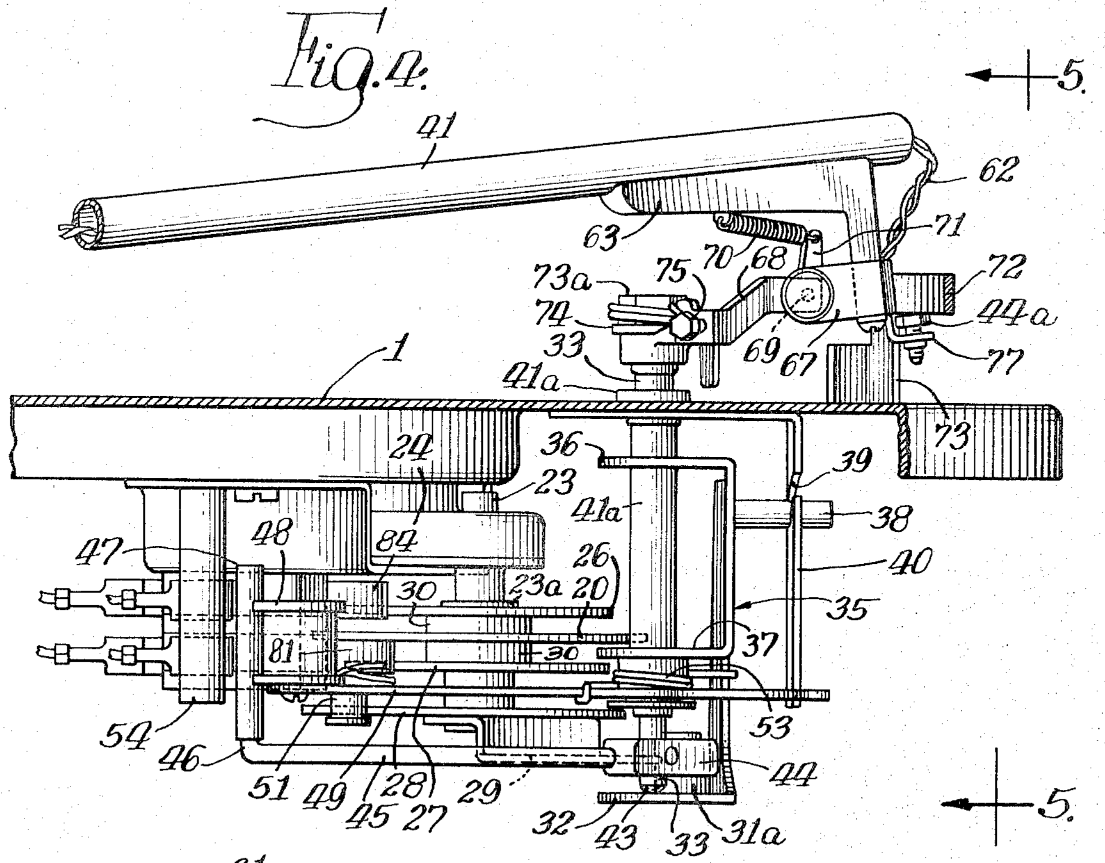
FIG. 4 is a vertical section taken on the broken line 4—4 of FIG. 2 and shown in elevation in the direction of the arrows 4—4 of FIG. 2.
Figure 5:
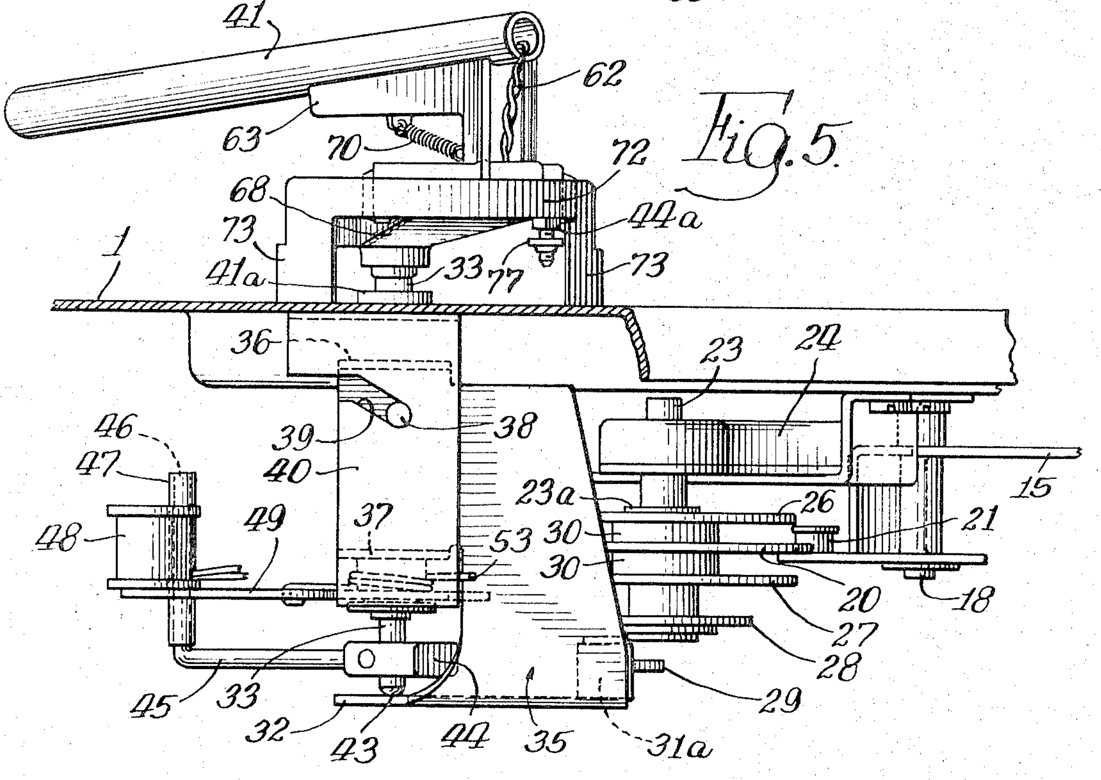
FIG. 5 is a view taken on the line 5—5 of FIG. 4 looking in the direction of the arrows, showing in elevation the cam shaft with cams and the means for raising the tone arm shaft to elevate the pick-up end of the tone arm.

Referring to FIGS. 1, 4 and 5 a rectangular stamped sheet metal frame 1 forms the support for the working parts of the machine hereinafter described. Apparent from the plan view of FIG. 1 is the rotatable turntable 2 which is sunk into a depression 3 to bring the top of the turntable 2 slightly above the level of the top surface of the frame plate 1. The turntable 2, which rotates on a fixed shaft, and shaft 4 carry a guiding spider **4*a* for centering the disc (a portion of which is indicated in FIG. 1). In the embodiment herein illustrated the guiding spider 4*a*** has a diameter of approximately 1 ½ inches and the turntable has a diameter of approximately 9 inches. A cooperating disc having an outer diameter of the order of 7 inches and a central hole diameter of approximately 1 ½ inches is used in the embodiment herein illustrated.

The turntable 2 has a depending flange **2*a* which is engaged by driving wheel 5 which is also in engagement with the motor shaft (see FIGS. 1 and 3) and which is carried on a link 5*a*, which link is pivoted at 6 upon the arm 7 of the lever pivoted at 8 on the frame 1. The lever 7, 9 is urged in the counterclockwise direction by a tension spring 10 attached at its fixed end 11 to the frame. The spring 10 operates on a short arm 9 of the lever 7, 9 to thrust the idler wheel 5 into engagement with the rim 2*a* of the turntable and also into engagement with the driving pulley 12 of the motor 13. Thereby the motor 13 of approximately 3,600 rpm drives the turntable at a speed of approximately 45 rpm. This speed may be varied. The drive between the motor 13 and the turntable may be interrupted by counterclockwise movement of the spring biased arm 15 which as shown in FIG. 3 is urged in a counterclockwise direction by the tension spring 16. The arm 15 is connected to a cam follower arm 17, the two arms 15, 17 being pivoted on the pin 18 and moved under the control of idler control arm cam 20 (see FIGS. 2, 3, 5 and 7). The cam 20 has a depression or drop 22 into which the pin 21 on the arm 17 may move to swing the arms 15 and 17 in a counterclockwise direction, as viewed in FIG. 3, by the spring 16 which then throws the drive, from the motor 13 to the rim of the turntable, out of operation to stop the movement of the turntable. This is done by movement of the arm 15 counterclockwise against the pin 6 of the lever arm 7 upon which pin 6 the link 5*a*, which carries the rubber faced roller 5, is carried. The roller 5 is thrust against the motor pulley 12 and the turntable rim 2*a* by the spring 10 acting in tension upon lever arm 9**.

CONTROL CAMS AND DRIVE THEREOF

Figures 2, 8, 9, 10:
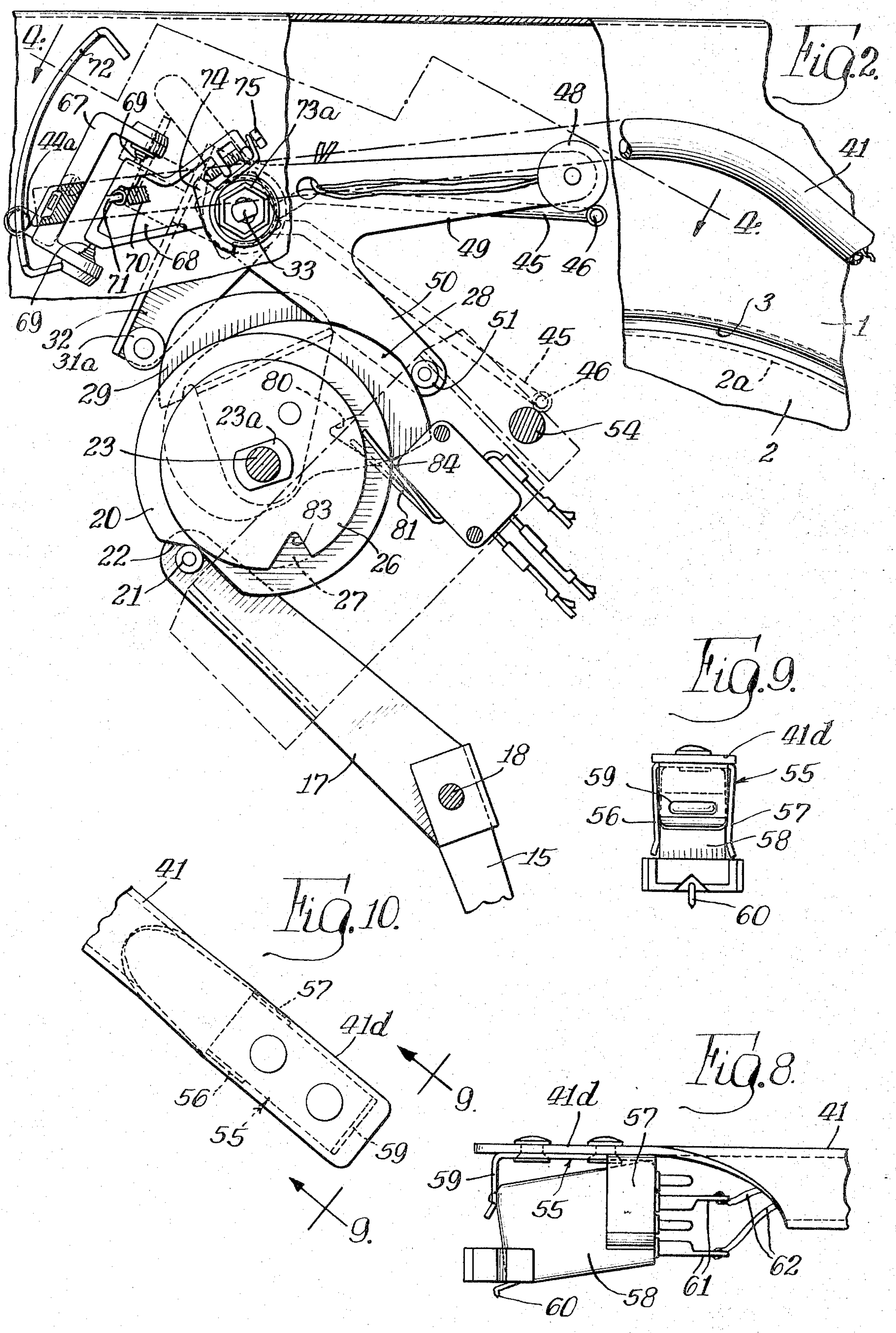
FIG. 2 is a fragmentary top plan view similar to FIG. 1 on a substantially full scale and with the frame and turntable removed.
FIG. 8 is a side elevational view of the outer end of the tone arm showing the mounting of the pick-up and the electric connections thereto.
FIG. 9 is an end elevation of the tone arm and pick-up taken one the line 9—9 of FIG. 10.
FIG. 10 is a top plan view of the tone arm and pick-up shown in FIGS. 8 and 9.
Figure 3:
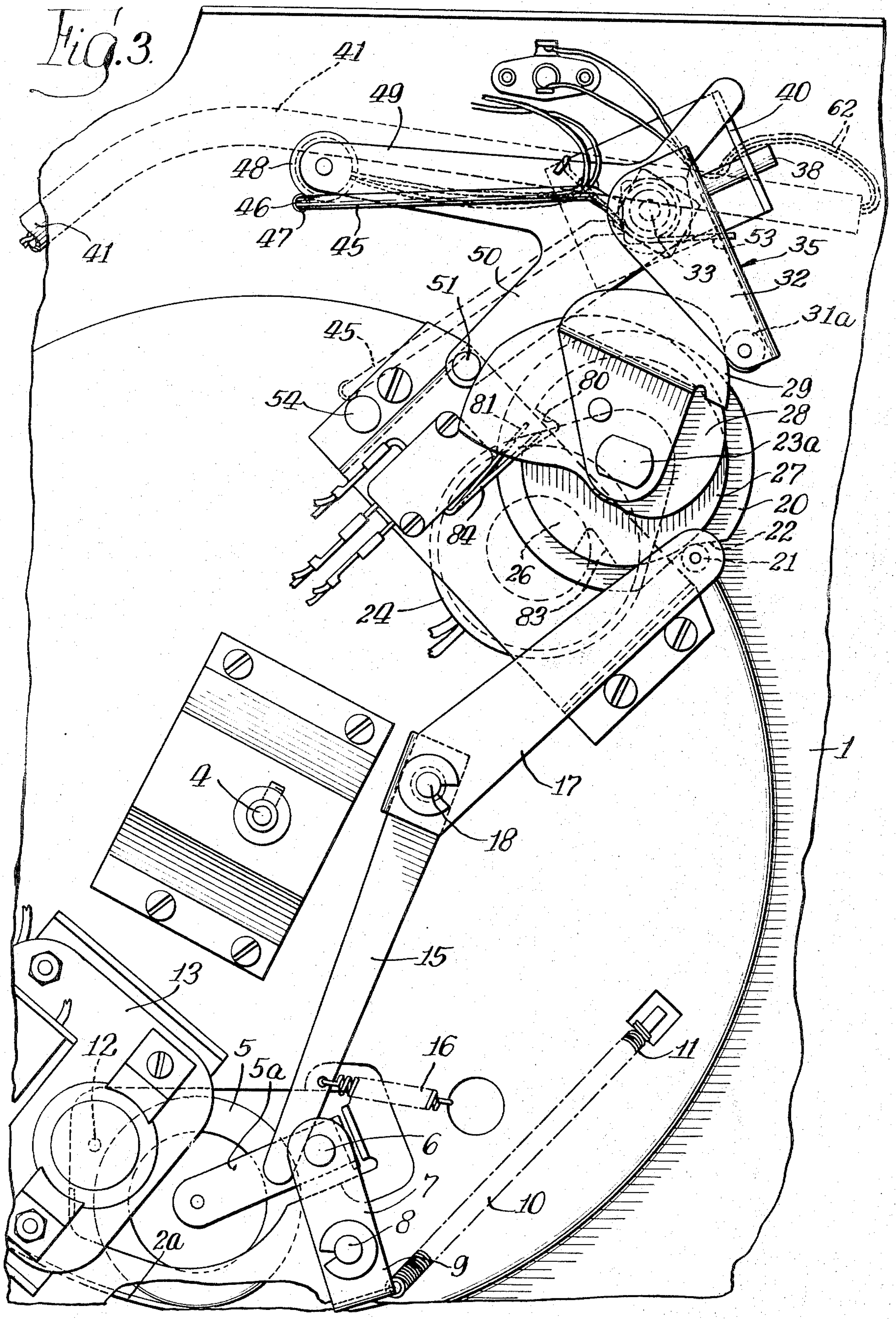
FIG. 3 is a bottom plan view of the frame and parts supported thereon.
Figures 6, 7:
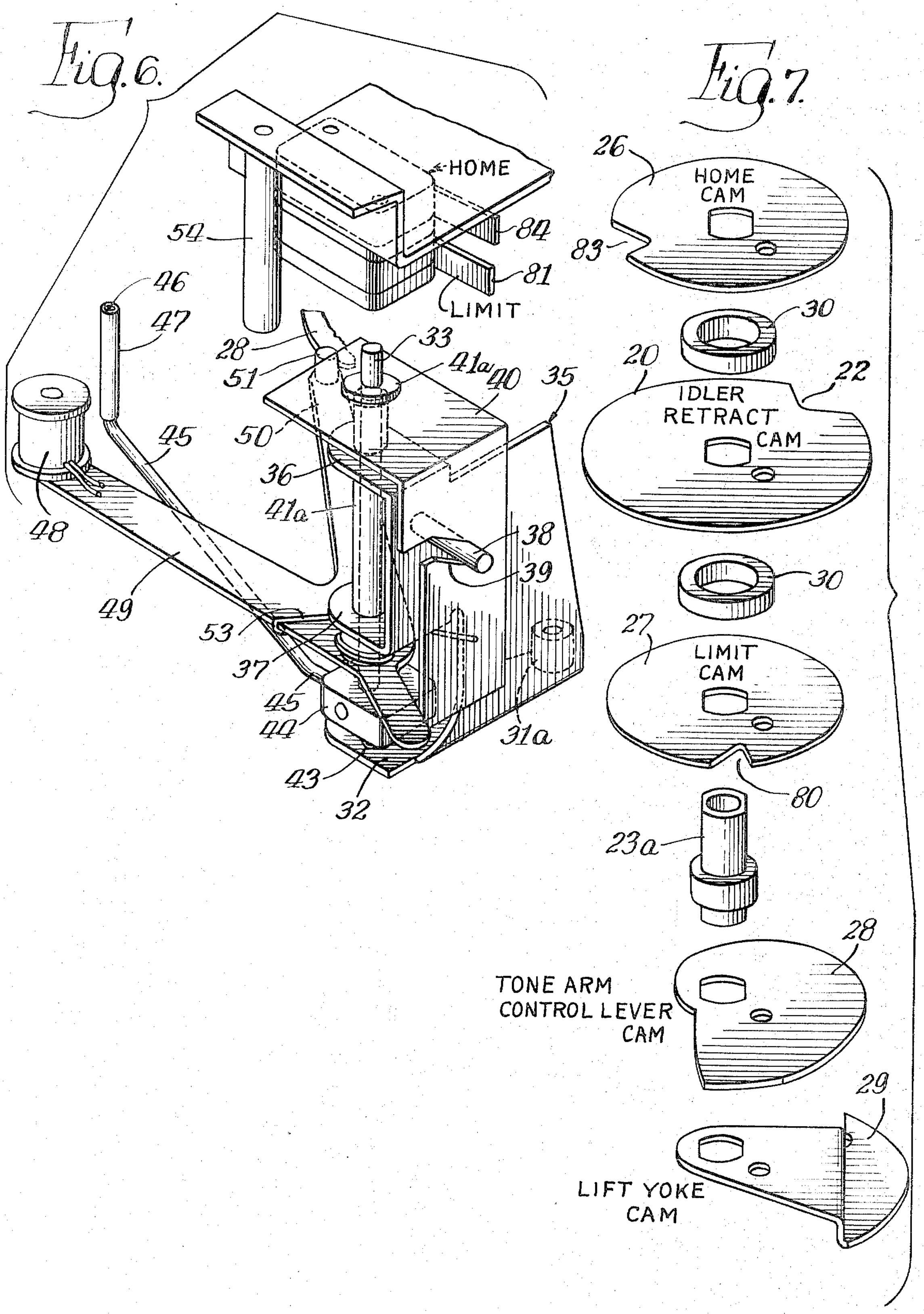
FIG. 6 is an isometric dissected view of the lower end of the tone arm shaft with tone arm lever and tone arm control lever and means for raising and lowering the tone arm shaft and for controlling the rotational movement of said shaft.
FIG. 7 is an exploded view of the cam shaft and cams.

A series of control cams which govern or produce the sequence of operations of the parts of the device is mounted on a cam shaft 23 (omitted from FIG. 7 but shown in FIG. 2). This cam shaft 23 is driven by a motor independently of the turntable drive.

A series of five cams, shown in FIG. 7 in disassembled relation, are assembled upon a common cam drive shaft sleeve **23*a*, the shaft sleeve 23*a* having flat faces upon opposite sides, as shown in FIGS. 3 and 7, with the central openings in the cams correspondingly apertured to fit the splayed or flattened sides of the shaft sleeve 23*a*. All five of the cams are mounted on the hollow flat-sided sleeve 23*a* with spacers 30 disposed between the three uppermost cams 26, 20 and 27 hereinafter described. The cam shaft sleeve 23*a* is fixed upon the shaft 23 which is an extension of the shaft not shown, which is back geared to the shaft of the cam motor 24 (FIG. 3**).

Cam 26 (FIG. 7) is the "home cam" which shuts off the driving motor 13 after the tone arm, hereinafter described, is brought to the center of the disc, which is the home position or starting position for the tone arm. Cam 20 is the "idler retract cam" which, as described above, causes the turntable 2 to stop for a brief pause by disconnection of the drive of the turntable by the motor 13 after the tone arm has been brought to the center or home position. The recess 22 of the cam 20 allows the lever 15, 17 to be retracted by the spring 16 for disconnecting the drive from the driving motor 13 to the rim of the turntable. Cam 27 is the "limit cam." This cam cooperates with a switch 81 in the cam motor circuit at a point of time ahead of the lift off of the tone arm from the record to cover the possibility that the search entry desired is at the outer edge of the record, i.e., at a radial location beyond the radial positin of an entry upon which the pick-up is operating for a specific groove entry. Thereafter cam 27 restores the motor circuit so as to continue the reading after the tone arm has moved to the center.

The fourth cam 28 is the "tone arm control lever cam" which moves the tone arm control lever outwardly from the center of the record disc and thereafter allows its return to home position.

The fifth cam 29, illustrated in FIG. 7, is the "lift yoke cam" which operates in connection with the mechanism shown in FIGS. 4 and 5 serving more particularly to raise the tone arm actuating shaft 33 and connected tone arm 41 illustrated in FIGS. 4 and 5 by the mechanism shown in FIG. 6.

The cam 28 is the tone arm control lever cam for controlling the angular motion of the tone arm actuating shaft 33 and the connected tone arm 41 for swinging the tone arm outwardly from its home position where the needle is stationed adjacent the center of the turntable. This cam 28 advances the tone arm 41 with its pick-up, which is shown in plan view in FIG. 1, to move it from its central or home position radially of the record toward the outer edge of the same while the needle is in contact with the surface of the record. FIG. 1 shows the tone arm in its extreme outer position, and the path of return to home position is indicated by the arcuate line, with arrowheads, 30*a*.

The cam 29 shown in FIG. 7 is the lift yoke cam also shown in plan view in FIG. 2. It engages the cam follower roller 31*a* mounted on the lower or horizontal flange 32 of the tone arm lift yoke member 35. The tone arm actuating shaft 33 extends down through the tone arm lift yoke member 35 with its two integral lugs 36 and 37 embracing the stationary sleeve 41*a* (FIGS. 4 and 6) which guides the tone arm actuating shaft 33 vertically therein. The raising and lowering of the shaft 33 is accomplished by the yoke member 35. This member 35 is adapted to be moved rotarily on the axis of the tone arm shaft 33 by means of its lugs 36 and 37 and engagement of the lift yoke cam 29 by the roller or follower 31*a* shown in dotted lines in FIGS. 5 and 6. Upon the lower horizontal portion 32 of the yoke member 35 rests the lower hemispherical end 43 of the tone arm actuating shaft 33. The guiding sleeve 41*a* (FIG. 4) is fixed to the frame plate 1 and serves to guide the tone arm actuating shaft 33 up and down with the lower convex or hemispherical end of the shaft 33 resting at 43 on the horizontal flange 32 of the movable tone arm lift yoke member 35. The vertical motion of the tone arm actuating shaft 33 is produced by the cam 29 engaging the roller 31*a* and causing the pin 38 to swing to the left as viewed in FIG. 6 in inclined slot 39 comprising cam means of stationary bracket 40 thereby to raise the tone arm lift yoke which, engaging the lower end 43 of the tone arm actuating shaft 33, causes the same to rise and swing the tone arm upwardly to the desired position.

The lower end of the tone arm actuating shaft 33, as shown in FIG. 6, has a clamping block 44 attached to it by a set screw to permit angular adjustment. A tone arm actuating lever 45 is fastened in said block 44 radially of the tone arm actuating shaft 33. The outer end of the tone arm actuating lever 45 is bent up into a vertical position, as shown at 46, to register with the flanges, which constitute poles, of the electromagnet 48 which electromagnet flanges are movable in the same radius and elevation as the magnetic armature portion 47 or portion 46 of the tone arm actuating lever 45. The tone arm control lever 49 is a Y-shaped member which, at the junction of the limbs thereof, is journalled on the tone arm shaft bushing. The lever 49 which carries the magnet 48 and the cam follower arm 50 are adapted to be actuated by the tone arm control cam 28. The tone arm actuating lever 45 is held magnetically to the magnet 48 when the same is energized so that the two levers 49 and 45 may be moved in conjunction away from the home or zero position which they occupy when the tone arm 41 is in its innermost or home position. A tension spring 53 embracing the lower end of the tone arm shaft 33 is tensioned between the tone arm control lever 49 and the tone arm yoke member 35 in a direction to swing the lever 49 and magnet 48 in the clockwise direction, as viewed in FIG. 6, causing it when released by cam 28 to engage the armature portion 47 of the tone arm actuating lever 45 and swing it clockwise into engagement with the set down locating stud 54 which is rigid with the main frame member 1.

Since the information on the record may lie at the outer radial limits of the groove on the record, the tone arm control cam 28 on the search operation of moving the tone arm to the outermost position (and thereafter to be released to travel inwardly) will swing the tone arm control lever 49 to its maximum outward position, even though the magnet 48 has been deenergized according to index control and the tone arm actuating lever 45 will have remained with the tone arm actuating shaft 33 and the tone arm following the spiral groove in the inward radial direction. Accordingly when the tone arm has been moved to its outermost position, cam 27 will have advanced to the point where its notch 80 trips the motor control switch member 81 to stop the cam motor. This stopping of the motor is only long enough to allow for playing of one or more of the outer record grooves and immediately thereafter the cam motor is reenergized. After the cam motor is reenergized and switch 81 has ridden out of the notch 80 of cam 27, the lift yoke cam 29 operates the lift yoke member 35 to lift the tone arm clear of the record. Thereafter the roller 31*a* on the tone arm control lever passes off of the maximum radius of the cam 28 which allows the tone arm actuating shaft 33 to turn and tone arm 41 to return to home position at the center of the record. This motion is accomplished by the torsion spring 53 (FIG. 6).

The home cam 26 has a notch 83 which cooperates with the switch 84 to shut off the cam motor when the tone arm has returned to home position and the search operation has been completed on that particular cycle.

When the notch 83 in the home cam 26 has opened the control switch 84, the idler retract cam 20 will have presented its notch 22 to the pin 21 on the idler control arms 15, 17 to stop the rotation of the turntable by removing the rubber-faced roller 5 from driving engagement with the motor shaft 12.

TONE ARM

The body of the tone arm 41 is constructed of a tube of light metal to minimize inertia. The outer or free end of the tube is cut away as shown in FIGS. 8, 9 and 10 and the end flattened to provide a flat mounting base 41*d* for the spring clip 55 which has two laterally disposed gripping fingers 56, 57 for gripping the rear end of the pick-up member or cartridge 58 and a spring finger 59 with a recess for engaging a projection on the front end of the cartridge 58 whereby to present the needle 60 to the cooperating record and to dispose the terminals 61 of the pick-up to the rear for connection to conductors 62 which extend longitudinally through the tube to the rear of the same where they are carried down loosely as a twisted pair adjacent the hinged mechanical connections to terminals mounted on the main frame 1. The rear end of the tube is mounted on a generally L-shaped bracket 63 of die cast metal (FIGS. 4 and 5), the lower end of which constitutes a fork 67 (FIGS. 1 and 2). The fork 67 is hinged to the arm 68 by pivot pins 69 mounted on the arms of the fork 67 embracing between them the arm 68 which is journalled on the vertical axis which is the axis of the tone arm actuating shaft 33. The bracket 63 which is attached to the tone arm tube 41 swings on a horizontal axis on pivot pins 69 and a light tension spring 70 (FIG. 4) is connected between the supporting bracket 63 which supports the tone arm tube and a lug 71 which extends from the arm 68, tending to draw the tone arm 41 downwardly. The tone arm supporting bracket 63 carries a bracket 77 which has a screw 44*a* adjustably mounted thereto. The head of the screw 44*a* constitutes an engagement member or fulcrum member engageable with a friction track which the arcuate bottom edge of the bridge 72 comprises. The screw is adjustable to control the stylus lift height. The stationary bridge member 72 is arcuate in form concentric with the axis of the tone arm actuating shaft 33 and is supported at its ends 73, 73 on the main frame member 1 (FIG. 5).

The arm 68, upon which the bracket member 63 via 67 is mounted, pivots on horizontal axis 69 and it swings horizontally about the axis of the tone arm actuating shaft 33 and vertically about axis 69.

A hexagon nut 73*a* is screwed on and locked to the upper end of the tone arm actuating shaft 33 to clamp a spring tension adjusting arm 74 to the upper end of said tone arm shaft. A torsion spring connects said arm 74 with the horizontal arm 68 and adjusting screw 75, between said arm 68 and the arm member 74, permits angular adjustment on a vertical axis of the tone arm 41 relative to the tone arm actuating shaft 33 to adjust the home position of the tone arm actuating shaft 33, there being certain operating parts, above described, cooperating with the lower end of the tone arm shaft, i.e., below the main frame plate, which latter parts are not adjustable.

The bridge member 72 which is attached to the top of the main frame 1 has its lower or working edge disposed in a horizontal plane at right angles to the axis of the tone arm actuating shaft 33. It may be seen by reference to FIG. 4 that the tone arm and the parts rigidly connected thereto constitute a lever of the second class. the fulcrum is the head of the screw 44*a* bearing against the lower edge of the bridge 72. The power is applied on the horizontal axis of the pin 69 by raising and lowering of the tone arm actuating shaft 33. The load which the lever—namely, the tone arm—carries is the weight of the pick-up and the arm itself. When the tone arm is pressed vertically upward, being guided by the bushing 41*a*, pressure is applied on the horizontal axis 69 (FIG. 4). The head of the screw 44*a* engages the arcuate downwardly facing edge of the bridge member 72 and acts as a fulcrum to cause the tone arm 41 to swing about the point of engagement of the screw 44*a* with the bridge member 72. The screw 44*a* is adjustably mounted on a bracket 77 attached to the underside of the vertical leg of the mounting bracket 63 upon which the tube of the tone arm 41 is mounted.

ELECTRICAL CONNECTIONS

The electrical connections for control and operation of the mechanism above described are not herein claimed and form no part of the present invention beyond that which is necessary for the operation of the motors, the magnet 48 and the tone arm pick-up, all of which will be obvious to those skilled in the art. The control circuits are plugged in to the multiple socket 90 at the corner of the frame parts 1 (FIG. 1).

OPERATION

The operation of the mechanism above described will be apparent to those skilled in the art. Although the mechanism and the circuits applicable to the operation and control of the mechanism is described in broad outline, the operating and control circuits are not claimed herein and hence are not described in detail.

In the system of information storage and retrieval, the above described mechanism constitutes the mechanical phase of the system. The system as a whole involves three essential acts, the first being the depositing or recording of the information on the record R in such form that the information may be located and retrieved. The second act is the indexing which is really a record of the items recorded and the location in which the items may be found. The third phase is the so-called search which consists in locating, identifying, and reading out the things sought.

In the present construction the record R carries on its face a spiral groove, the successive turns of which are separated radially by ridges. The grooves and ridges extend from a central area at the central part of the disc record, in a spiral to the outer periphery of the disc. The tone arm 41 is normally swung to a position over the disc record R adjacent the central area outside of which the groove lies. The innermost position of the tone arm is the home position or starting point from which the search proceeds. When the tone arm is in its home position at the central part of the disc, the torsion spring 53 (FIGS. 4 and 5) causes the tone arm control lever 49 which bears the magnet 48 to swing against the vertical end 46 of the tone arm acutating lever 45 and to swing both levers 45 and 49 against the set-down locating stud 54 (FIG. 4). The tone arm is at this point in its home position.

The driving motor 24 for the cam shaft 23 is energized and rotates the cams in a counterclockwise direction, as viewed in FIG. 2. As the cam motor rotates the periphery of the cam 28 engages the pin 51 on the arm 50 of the tone arm control lever 49. Since the cam 28 has a periphery of increasing radius for a major part of its circumference, the rotation of this cam swings the tone arm lever 49 with the magnetically attached tone arm actuating lever 45 pulled along by the said magnet 48. The tone arm actuating shaft to which the tone arm lever 45 is clamped will be swung in the counterclockwise direction as viewed in FIG. 2 to move the outer end of the tone arm 41 and its pick-up 58 outwardly from the center of the disc dragging the same transversely across the ridges between grooves. The controlling electric circuits count the grooves or ridges between grooves until the needle 60 of the pick-up 58 has arrived at the number of the groove for which the information sought is indexed. Thereupon the control circuits deenergize the magnet 48 which allows the tone arm needle free play to follow the groove in which it has been released. The information which is transmitted to the pick-up from the groove selected is conveyed to the central control station.

When the magnet 48 is deenergized and releases the tone arm actuating lever 45, the groove in the record takes control of the movement angularly of the tone arm actuating shaft 33 and when the recorded information has been received the lift yoke cam 29, bearing against the roller 31*a* which is carried on the lower flange 32 of the tone arm lift yoke member 35 (FIG. 6), is swung in a counterclockwise direction as viewed in FIG. 6 whereby the inclined slot 39 in angle member 40, cooperating with the pin 38 on the lift yoke member, raises the lift yoke member 35. This causes the lower flange 32 of the tone arm lift yoke member 35 to rise and carry upwardly with it the tone arm actuating shaft 33 which slides in the bushing 41*a*.

The upward thrust and movement of the tone arm shaft 33 raises and carries upwardly the arm 68 (FIGS. 2 and 4). The rise of the arm 68 carries with it the pivot pin 69 and with it the fork member 67 (FIG. 2) which has integral therewith the supporting bracket 63 and which carries upwardly beneath the bridge member 72 and adjustable nylon screw 44*a*, the head of which engages and is guided along the bottom edge of the bridge member 72. This applies the operating power to the second class lever—namely, the tone arm 41.

The tension spring 70, connected between the bracket 63 which is attached to the rear end of the tone arm and the arm 71 attached to the rearwardly extending arm 67 that carries the adjusting shoe 44*a*, is stretched as the tone arm swings upwardly away from the record and thereby prevents excessive lifting of the tone arm and controls the pressure of the needle against the record. When the lift yoke cam 29 engages the roller 31 on the lift yoke lever the diagonal lift slot 39 operating on the pin 38 to raise the tone arm lift yoke and thereby swing the tone arm upwardly away from the surface of the record, the tone arm is returned to the home position by the spring 53 (FIGS. 4 and 5) which acts in one direction against the tone arm lift yoke member 35 (FIG. 6) and the tone arm control lever 49 to swing the magnet 48 against the vertical end 46 of the tone arm actuating lever 45 and to carry itself and said tone arm actuating lever 45 back against the set-down locating stud 54. When the parts are in that angular position the tone arm actuating shaft 33 will have carried the tone arm 41 to its home position at the central part of the record R.

During the inward swing of the tone arm lever towards the center of the record to reach its home position, the adjustable nylon screw 44*a* is swung in an arc concentric with the curved bridge or yoke 72 and in contact with the lower edge thereof to control the height of the tone arm.

The increased length of the tone arm 41, made possible by the mounting of it as a second class lever, is advantageous in permitting the more nearly vertical movement of the needle into the groove. Also the screw 44 and bridge 72 permit an adjustment of the extent of lift of the tone arm and needle.

The provision of pick-up member 58 with quick detachable connectors to the electric conductors, together with a releasable spring mount for gripping the pick-up, permits a readily performed operation of substituting a fresh pick-up member and needle for one which may have been damaged or become inoperative.

In the operation of the cam shaft by the driving motor 24 the tone arm control lever cam 28 engages the roller 51 on the arm from control lever at the same time that the magnet 48 on the tone arm control lever arm 49 is energized to attract the vertical portion of the tone arm actuating lever 45 and to begin to move it away from the set down locating stud 54 thereby to move the tone arm and its pick-up transversely across the grooves in a generally outward radial movement. The number of such ridges which the pick-up needle encounters are counted at the control station and when the index numbers of the groove has arrived the magnet 48 is deenergized and releases the tone arm actuating lever 45. Thereupon the tone arm and tone arm actuating shaft 33 are free to move as guided by the pick-up needle in the groove.

When the read-out operation has been completed the lift yoke cam 29 engaging the roller 31*a* on the lift yoke member raises, by means of the lifting slot 39 and the pin 38 connected to the lift yoke member, the lift yoke. The motor is then excited to move the cam shaft forward, allowing tone arm control lever 49 to swing back and carry tone arm actuating lever 45 against the set down stop 54.

We claim:

1. In combination a vertical tone arm shaft, a stationary bearing for said shaft permitting axial and rotary movement of said shaft, said shaft bearing a horizontal pivot at its upper end, a generally horizontal tone arm pivoted intermediate its inner and outer ends on said pivot, a pick-up member at the outer end of said tone arm, a stationary bridge adjacent the inner end of the tone arm and extending over said inner end, and a fulcrum member on the inner end of the tone arm engageable with said bridge upon vertical movement of said shaft whereby the outer end of the pick-up arm is raised.

2. The combination of claim 1 with means for turning the tone arm shaft to move the tone arm from a predetermined position in a direction parallel to the plane of the record, and spring means acting on said shaft for returning the tone arm toward said predetermined position.

3. The combination of claim 1 with spring means to rotate the tone arm shaft for returning the tone arm to home position while said fulcrum member is in engagement with said bridge.

4. In combination with the elements of claim 3, a locating stud (54), a tone arm actuating lever connected to the tone arm actuating shaft, a tone arm control lever pivoted concentrically with said shaft and having a magnetic clutch for connecting it with the tone arm actuating lever whereby the two levers may be moved simultaneously away from the locating stud, and the tone arm control lever may be moved independently of the tone arm actuating lever when the magnetic clutch is released, cam means for moving the tone arm control lever, and spring means connected to said control lever to move both levers against the locating stud when the control lever is released by said cam.

5. The combination of claim 1 with cam operated means for rotating the tone arm shaft away from its home position, said cam operated means including a magnetic coupling.

6. The combination of claim 5 with spring means for rotating the shaft to move the tone arm to its home position.

7. The combination of claim 5 with cam controlled means for raising said tone arm shaft to lift the tone arm above the record during the return of the tone arm to its home position.

8. In combination with a frame, a vertical tone arm shaft, a tone arm pivoted on a horizontal axis intermediate its ends on the upper end of the tone arm shaft, the pivot being located adjacent one end of the tone arm to provide a short arm and a long arm, a pick-up needle on the end of the long arm, a stationary bridge on the frame and extending over the short arm, said bridge having an arcuate surface engageable by the short arm of the tone arm when the tone arm shaft is raised, cam means for raising said shaft to bring the short arm into engagement with said arcuate surface, continued upward movement of said shaft pivoting said tone arm about said hinged axis to raise said needle.

9. The combination of claim 8 with a sleeve embracing said tone arm shaft, a yoke engaging said shaft to raise and lower the same, a pin extending laterally from the yoke, a bracket having a lift slot engaging said pin, said bracket and pin being rotatable relatively to each other about the longitudinal axis of the sleeve to raise and lower the tone arm shaft.

10. In combination, a vertical tone arm shaft (33), a tone arm lift yoke (35) embracing said shaft and connected thereto for joint endwise movement, cam means (38–39) for raising and lowering said shaft and lift yoke, a horizontal tone arm actuating lever pivoted on a vertical axis carried on said shaft, a locating stud (54) adapted to be engaged by said tone arm actuating lever when the tone arm is in a predetermined angular position, a tone arm control lever (49) journalled coaxially with said tone arm actuating lever, cooperating magnetic clutch members carried by said tone arm actuating lever and said tone arm control lever for permitting the tone arm control lever, when the clutch is magnetized to rotate said tone arm actuating lever away from said locating stud and for releasing said tone arm actuating lever from the tone arm control lever when the clutch is deenergized, and spring means for swinging said tone arm control lever and said tone arm actuating lever against said locating stud.

11. The combination of claim 10 with a cam and cam follower for moving the tone arm control lever and through energization of said magnetic clutch permitting the tone arm control lever to move the tone arm lever away from said locating stud.

12. In combination, a vertical tone arm shaft, a tone arm pivoted on the upper end of said shaft, a lifting yoke carried on said shaft for raising the tone arm shaft and tone arm, a motor driven cam shaft carrying a plurality of cams, a stationary set down locating stud, a tone arm control lever journalled at its inner end on the axis of the tone arm shaft and having a magnetic clutch member attached thereto, a cooperating magnetic clutch member connecting said tone arm control lever with said tone arm shaft for rotation therewith, a tone arm lift yoke pivotally mounted concentric with said tone arm shaft, a flange forming an extension of said lift yoke and having a cam follower engageable with one of the cams on said motor driven cam shaft, a pin mounted on said lift yoke and a stationary lift bracket having a cam slot cooperating with said pin to raise and lower the tone arm shaft, said last-named flange being actuated by a cam on said motor driven cam shaft to cause raising and lowering of the tone arm.

13. In combination, a frame, a motor driven turntable mounted on said frame, said turntable being adapted to carry a record disc having grooves on the exposed face thereof, a vertical tone arm shaft and a tone arm pivoted thereon and having a pick-up for engaging the record disc, said tone arm being movable horizontally over the surface of said disc, said vertical tone arm shaft being movable axially and rotarily and having a home position, a set-down locating stud for stopping the tone arm at a point adjacent the center of the turntable on its return to its home position, a motor driven cam shaft having a cam and a cam follower connected to said tone arm for swinging the tone arm with pick-up over but out of contact with the surface of the record, and electromagnetic coupling means between the cam follower and the tone arm shaft for pulling the tone arm in its outwardly swinging motion, release of said coupling freeing the tone arm and allowing the pick-up to drop into and follow the groove into which it is released.

14. In combination, a frame, a turntable mounted on a vertical shaft on said frame, a plurality of motor driven cams and cam followers, a tone arm carried on a vertical tone arm shaft which is vertically movable by one of said cam followers to raise and lower said tone arm, said tone arm being pivoted intermediate its ends and having a pick-up at one end for cooperating with a disc on the turntable, a setdown stud for stopping rotation of the tone arm shaft and tone arm at homing position, a tone arm actuating lever connected to the tone arm shaft for moving the tone arm shaft angularly towards and away from its homing position, a tone arm control lever pivoted on the axis of the tone arm shaft and swingable by one of said cam followers to move the tone arm away from its homing position, magnetic clutch members connecting said tone arm control lever and said tone arm actuating lever for pulling the tone arm actuating lever in a direction to cause it to move the pick-up on the tone arm substantially radially over the record, spring means for moving the tone arm control lever and the tone arm actuating lever into engagement with the set-down stud, and means comprising a cam and cam follower aforesaid for lowering the tone arm shaft to lower the pick-up needle down onto the record.

15. In a device of the class described, a frame, a shaft journalled on a vertical axis on said frame, said shaft being adapted to support a tone arm at its upper end, a stationary bridge member mounted on said frame and having an arcuate downwardly facing friction track, the axis of said arcuate track being substantially concentric with the axis of said shaft, a tone arm support member comprising a body portion pivoted on a horizontal axis to said vertical shaft and having an engagement member disposed on one side of the horizontal pivot and facing up for engagement with said friction track, said support member being pivoted on a horizontal axis on said shaft, a lightweight tubular tone arm section secured at its inner end to said support member having at its outer end a spring clip for mounting a pick-up member.

16. The combination of claim 15 wherein the tone arm support member is a relatively heavy bracket of short radial length from said vertical axis and the tubular arm is a light-weight metal tube secured at its inner end to said support member and being of a length great enough to reach across the radius of a phonograph record with which it cooperates, the wall of the outer end of the tube being cut lengthwise and opened out laterally to provide a seat, and a three-pronged spring clip having a bottom side engaging and being attached to said flattened-out tube end.

* * * * *